United States Patent
Kohl et al.

(10) Patent No.: US 6,567,476 B2
(45) Date of Patent: *May 20, 2003

(54) DATA SYNCHRONISATION PROCESS, AND TRANSMISSION AND RECEPTION INTERFACES

(75) Inventors: Walter Kohl, Lauffen (DE); Richard Schleupen, Ingersheim (DE); Thomas Koss, Reutlingen (DE); Lothar Jakobi, bad Urach (DE); Guenter Nasswetter, Gomaringen (DE); Helmut Suelzle, Freiberg (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,363

(22) PCT Filed: Jul. 22, 1997

(86) PCT No.: PCT/DE97/01532
§ 371 (c)(1),
(2), (4) Date: Mar. 11, 1998

(87) PCT Pub. No.: WO98/05139
PCT Pub. Date: Feb. 5, 1998

(65) Prior Publication Data
US 2001/0031026 A1 Oct. 18, 2001

(30) Foreign Application Priority Data
Jul. 24, 1996 (DE) ............... 196 29 699
Sep. 23, 1996 (DE) ............... 196 38 872

(51) Int. Cl.[7] ............................................. H04L 25/38
(52) U.S. Cl. ................................... 375/293; 375/364

(58) Field of Search ........................ 375/282, 286, 375/293, 259, 288, 364, 368; 340/3.1

(56) References Cited

U.S. PATENT DOCUMENTS

| | | | |
|---|---|---|---|
| 2,794,858 A | | 6/1957 | Houghton |
| 3,863,025 A | * | 1/1975 | Gonsewski et al. ......... 375/282 |
| 3,903,504 A | * | 9/1975 | Rogers ....................... 375/329 |
| 3,991,379 A | * | 11/1976 | Chadwick et al. ............ 327/98 |
| 4,355,385 A | | 10/1982 | Hampshire |
| 4,442,528 A | * | 4/1984 | Fukuda ....................... 375/293 |
| 4,475,212 A | * | 10/1984 | McLean et al. .............. 375/286 |
| 4,611,336 A | * | 9/1986 | Fryer .......................... 375/357 |
| 5,128,972 A | * | 7/1992 | Horinouchi et al. ........ 375/377 |
| 5,159,335 A | * | 10/1992 | Veneruso ............... 340/870.02 |
| 5,175,734 A | | 12/1992 | Sarkoezi |
| 5,613,196 A | * | 3/1997 | Barnes et al. ................. 455/15 |
| 6,122,071 A | * | 9/2000 | Yoshida ...................... 358/434 |

FOREIGN PATENT DOCUMENTS

| | | |
|---|---|---|
| DE | OS 35 06 118 | 2/1985 |
| GB | 2 180 712 A | 4/1987 |

\* cited by examiner

Primary Examiner—Stephen Chin
Assistant Examiner—Kevin M Burd
(74) Attorney, Agent, or Firm—Michael J. Striker

(57) ABSTRACT

The method of transmitting data as a sequence of high bits and low bits over a transmission line from a transmitting device to a receiving device includes transmitting synchronization signals over the transmission line and transmitting one and only one high bit or one and only one low bit over the transmission line at an end of each synchronization signal. When the predetermined voltage levels for the high bit, low bit and synchronization signals are different from each other, the method is implemented in an especially simple manner. The interfaces for the receiving and transmitting devices for performing the method are also described.

25 Claims, 7 Drawing Sheets

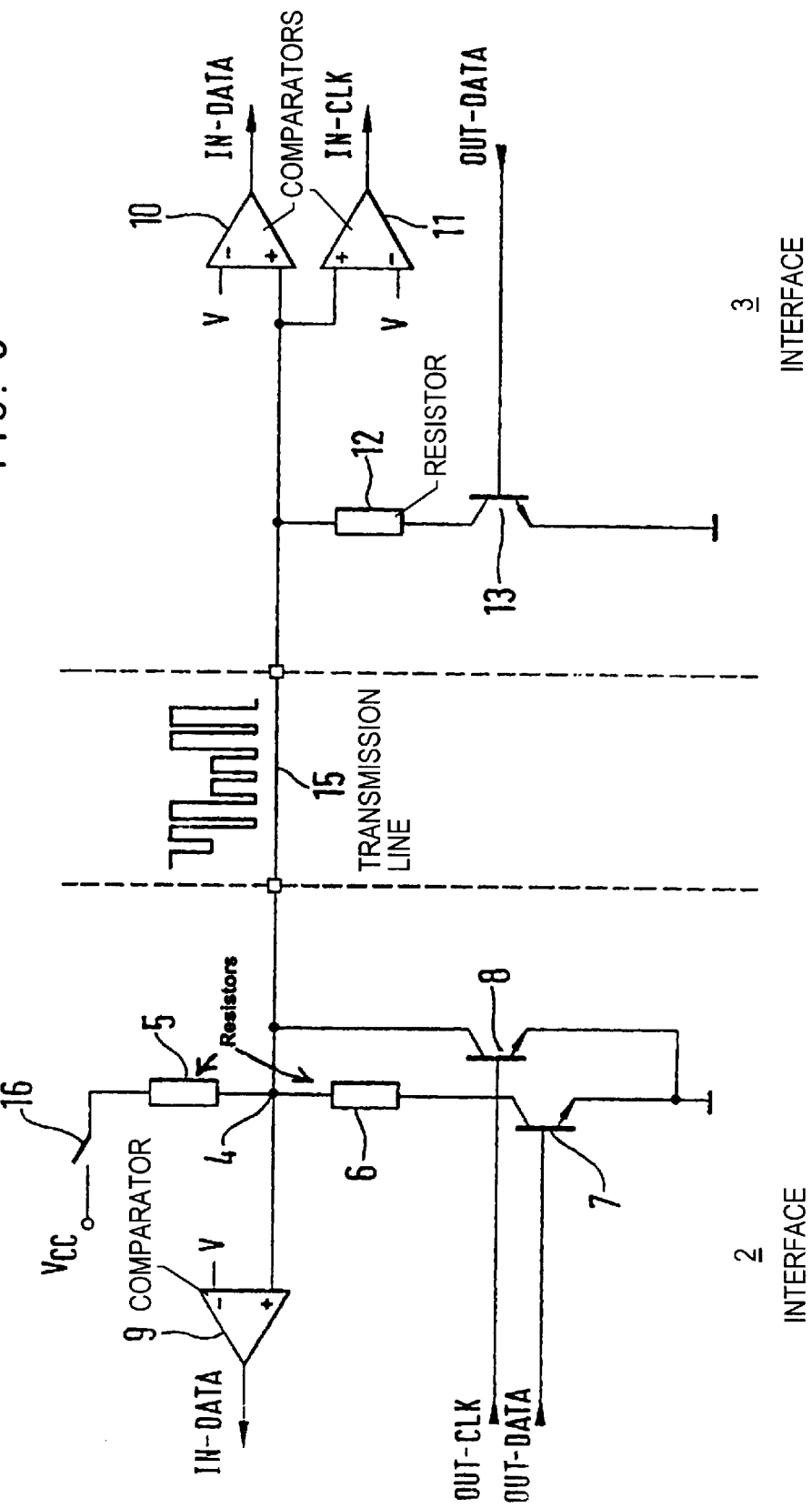

DATA SYNCHRONISATION PROCESS, AND TRANSMISSION AND RECEPTION INTERFACES

BACKGROUND OF THE INVENTION

1. Field of the Invention

The invention relates to a method for transmitting data and on interfaces for transmitting or receiving data, by means of a predetermined sequence of a first state and a second state, distinguishable from each other, and relates in particular to a voltage controller with an interface in a motor vehicle.

2. Prior Art

From German Patent Disclosure DE 35 06 118, a method for transmitting data over a data line is already known, in which a sequence of first and second states, distinguishable from one another, are transmitted over the data line. These states then represent a high bit or a low bit.

SUMMARY OF THE INVENTION

It is an object of the present invention to provide an improved method of transmitting data of the above-described kind.

It is another object of the present invention to provide improved interfaces for transmitting and receiving data according to the method of the invention.

The method and interfaces according to the invention have the advantage over the prior art that a third state is provided, which is utilized for transmitting a synchronization signal. The synchronization can therefore be generated in the data stations involved, and can be imparted to the other stations involved over the data line. As a result, it is possible for only one of the data stations involved internally to have the means for generating a synchronization signal, while the other stations need not have any such means.

It is especially advantageous that work can also be done with two voltage levels. This advantage is attained in that both the synchronization pulses and the other two items of information, such as a zero datum and a one datum are embodied by pulses of different signal lengths. Advantageously, the pulses that include the two items of information begin simultaneously with the respective synchronization pulse. The transmission is advantageously effected between a first data station and a second station, which communicate with one another through a transmission line. It is especially advantageous that the system can also be used when there are a plurality of receivers, and that a transmission protocol is produced.

Advantageous refinements of and improvements to the method and the interface of the invention are disclosed. The synchronization signal becomes especially simple if it comprises putting the data line into the third state for a predetermined minimum time. The receiving station can then be synchronized to the signal edge that indicates the end of the third state. It is then simple to write in a high bit or a low bit, by writing in, after the synchronization signal, whether the data line is in the first or the second state. It is also advantageous in this regard that the length of the synchronization signal or of the high bit or a low bit does not matter, as long as they each exceed a predetermined minimum time that is needed for reliable detection of the respective state on the data line. The various states on the data line are especially simply embodied by different voltage levels.

Using the interfaces of the invention in the method for data transmission of the invention can advantageously be done in the form of using a bit-synchronized interface in the motor vehicle. An especially advantageous application of the interface is the communication between the voltage controller and the on-board electrical system of a motor vehicle. Communication between the voltage controller and the microcomputer of the digital engine electronics as a component of the engine control unit is likewise advantageously possible.

BRIEF DESCRIPTION OF THE DRAWING

The objects, features and advantages of the invention will now be illustrated in more detail with the aid of the following description of the preferred embodiments, with reference to the accompanying figures in which:

FIG. 3 is a schematic circuit diagram showing an exemplary structure for the two interfaces of the data stations shown in FIG. 1;

DESCRIPTION OF THE PREFERRED EMBODIMENTS

Figure 1:
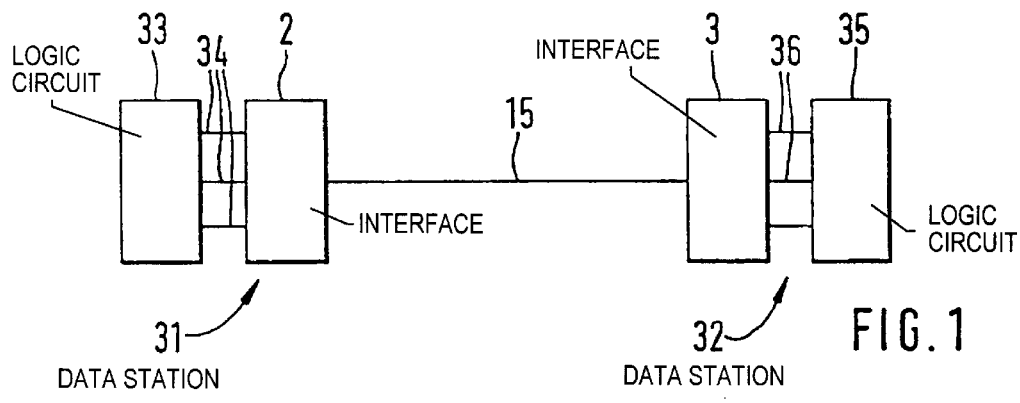
FIG. 1 is a schematic diagram showing respective data stations connected with a data transmission line by means of corresponding interfaces.

In FIG. 1, a first data station 31 and a second data stations 32 are shown, which communicate with one another by a transmission line 15. The first data station 31 has a microprocessor 33 and an interface 2, which communicate with one another over a plurality of lines 34. The second data station 32 has a logic circuit 35, which communicates with an interface 3 over a plurality of lines 36. The interfaces 2 and 3 have the task of preparing data, which they receive from the microprocessor 33 or the logic unit 35, for transmission over the transmission line 15, or correspondingly processing data, which the interfaces 2, 3 receive from the transmission line 15, for the microprocessor 35 or the logic unit 35. What is essential here is that the interfaces 2, 3 are embodied such that three different states are realized on the transmission line 15.

Figure 2:
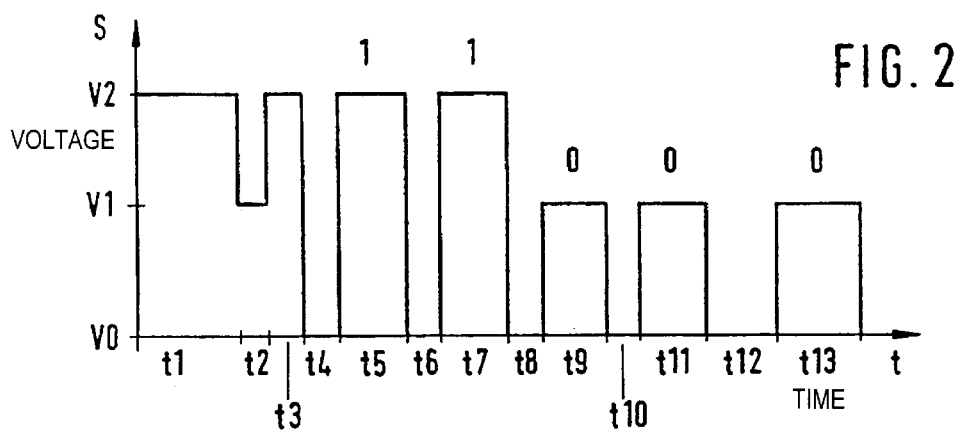
FIG. 2 is a graphical illustration of voltage as a function of time on the data transmission line showing different states of the data transmission line.

The different states that are realized on the transmission line 15 are shown in a graph in FIG. 2. The time t is plotted over the signal s; the signal here is realized in the form of different voltage levels V0, V1 and V2. V2 is the highest voltage level, and V0 is the lowest voltage level. In the time period or length of time t1, the transmission line 15 is in the state repose, which is realized here by the voltage level v2. For the ensuing description it will be assumed that the first data station 31 is transmitting a signal to the second data station 32. In the time period t2, the interface 2 pulls the transmission line 15 to the voltage level V1. This indicates that a data transmission is about to be done. An advance warning to the second data station 32 of this kind can be utilized for instance to activate an appropriate program in the second data station 32 that performs the processing of the data, as long as the second data station 32 likewise has a microcomputer for evaluating the data. The time period t2 and the subsequent time period t3, in which the repose level V2 is reestablished on the transmission line 15, are dimensioned in terms of their length such that sufficient time is available for preparing the second data station 32 for the reception of data. The bus level V2 subsequently represents the bit state "high", while the bus level V1 represents the bit state "zero". The transmission line 15 can also be applied to the level V0 by the interfaces 2, 3, as is the case for the time period t4. This time period t4 having the voltage level V0 represents a synchronization signal on the transmission line 15. This synchronization signal is generated for instance by the microprocessor 33 and then sent on to the interface 2 over one of the lines 34. The synchronization signal is also known as a clock signal or clock (CLK). As a function of this synchronization signal of the microprocessor 33, the interface 2 generates the synchronization signal on the transmission line 15, by pulling the transmission line 15 to the voltage level V0 for a predetermined minimum time period t4. The minimum time period is designed such that the receiving second data station 32 can reliably detect this signal on the transmission line 15. The receiving second data station 32 then uses this synchronization signal to generate an internal synchronization signal, with which the processing of the data is clocked. The receiving data station can be synchronized to the end of the time period t4, for example. As can be seen from FIG. 2, each time after the bus level V0 has been assumed either the bus level V1 or the bus level V2 is assumed; that is, after each synchronization signal, either a high bit or a low bit is transmitted. The receiving data station must therefore, each time after the end of the voltage state V0, sample the voltage level on the transmission line 1, in order to detect a high bit or a low bit. In the period t5, for instance, a high bit is transmitted with the voltage level V2. In the time period t6, a synchronization signal is again present, and in the time period t7, a high bit is again indicated by the voltage level V2. After the synchronization signal in the time period t8, a low bit is indicated on the transmission line 15 in the time period t9. In the time period t10 a synchronizing bit and in time period t11 a subsequent low bit are again transmitted. Up to this time, in FIG. 2, the synchronization signals have each been represented by time periods t4, t6, t8, t10 of equal length, and the bit states have been represented likewise by time periods t5, t7, t9 and t11 of equal length. Because of the simple synchronization, however, it is unnecessary for the time period for the synchronization signal or the individual data bit to have a predetermined length, as long as a certain minimum length, which is required for adequate identification of the voltage level on the transmission line, is adhered to. In the time period t12 and the time period t13, by way of example, a synchronization signal and a low bit respectively, are shown, which have time periods t12 and t13 that differ from one another. Thus the transmission method presented here is not required to adhere to predetermined lengths for the signal levels.

In FIG. 1, only a single data line 15 has been shown, which by way of example can be embodied by a wire that connects the two data stations 31 and 32 to one another. Alternatively, it is also possible instead of the single data line 15 to have two data lines, which are operated with a differential signal. In that case, the signal in FIG. 2 would not comprise an absolute voltage level on a transmission line but rather the difference between the voltage levels that are present on the two data lines. Instead of voltage levels, one or two data lines over which currents flow may also be used. Optical fibers are also suitable as a transmission line; in that case, the signal could comprise different intensities of light.

It has been stated with regard to the first data station 31 that it has a microprocessor 33, while the second data station 32 has a logic circuit. The method of the invention is especially advantageous for transmitting data if one of the data stations involved has high "intelligence", and the other data station or stations are embodied comparatively simply. The smart data station 31 therefore has a microcomputer 33, which can process many complex tasks. The microcomputer 33 also has an internal clock, with which an internal clock signal is available for generating synchronization signals. This synchronization signal is then transmitted by the transmission line 15 and serves as a standard for the processing of the data in the second data station 32, which is embodied simply. The second data station 32 for instance has only a simple logic circuit 35, which is clocked by the synchronization signal. A simple example of such a logic circuit is described in conjunction with FIG. 4. It is also possible to embody the data station 31 as a logic circuit, which has a source for a synchronization signal. This station can then transmit items of information to the data station 34 at spaced-apart times, for instance. Moreover, the data station may have a microcomputer that outputs data to be transmitted over parallel bus lines to a logic unit that then performs the actual transmission over the data line 15.

In FIG. 1, the data exchange between a first and a second data station 31, 32 is described. However, the method of the invention can equally well be employed if more data stations are involved, and in that case at least one of the data stations is capable of generating a synchronization signal. The data to be transmitted should in that case have addresses, which clearly show the intended destination station at the time of the particular data.

FIG. 3 shows a concrete embodiment of the interfaces 2 and 3. In the interface 2, the transmission line 15 is connected to a node 4 of a voltage divider comprising the resistors 5 and 6. The node 4 is connected to a supply voltage VCC via the resistor 5 and a switch 15. The node 4 is also connected via the resistor 6 to the collector of a transistor 7, whose emitter is connected to ground. The base of the transistor 7 is connected to a line Out-Data to the microprocessor 33, not shown here. Also in the interface 2, the transmission line 15 is connected to the collector of a transistor 8, whose emitter is connected to ground. The base terminal of the transistor 8 is connected to a line Out-CLK to the microprocessor 33, not shown. The transmission line 15 in the interface 2 is also connected to one input of a comparator 9, and the comparator has a further input for a comparison voltage V. The comparator 9 has an output In-Data, which is connected to the microprocessor 33.

In the interface 3, the transmission line 15 is connected to input each of a comparator 10 and a comparator 11. Each of these comparators 10, 11 also has a further input for a comparison voltage V. The comparator 10 has an output In-Data, which is connected to the logic circuit 35, not shown. The comparator 11 has an output IN-CLK, which is likewise connected to the logic circuit. Also in the interface 3, the transmission line 15 is connected via a resistor 12 to the collector of a transistor 13. The emitter of the transistor 13 is connected to ground. The base of the transistor 13 is connected to the logic circuit 35 via a line Out-Data.

If the switch 15 of the interface 2 is closed, then the transmission line 15 is connected to the potential VCC via the resistor 5, which establishes the repose potential of V2 on the transmission line 15. If a signal is present on the line Out-Data the transistor 7 is switched to be conducting, and the transmission line is pulled to a potential V1 by the voltage divider comprising the resistors 5 and 6. If a signal is present on the line Out-CLK, then the resistor 8 is made conducting, and the transmission line 15 is connected at low impedance to ground, so that a potential V0 is then established on the transmission line. The interface 2 thus has all the means for realizing all three voltage levels V2, V1 and V0, as a function of control signals of the microprocessor 33, on the transmission line 15.

In the interface 3, the comparison voltage V is selected for the comparator 10 in such a way that a signal, such as a high level is present at the output In-Data of the comparator if the transmission line 15 is at the value V2. The comparison voltage V is also selected such that at the output In-Data no signal or a low signal is present if the transmission line 15 is at the voltage level V1. Typically, a comparison voltage that is between V1 and V2 will be chosen for this purpose. The comparator 11 has a comparison voltage V which is selected such that the third state, that is, the voltage level V0, can be reliably detected. To that end, the comparison voltage is between V0 and V1. The interface 3 thus has means for distinguishing the first, second and third voltage levels on the transmission line 15, and as a consequence of making signals available for the logic circuit 31. On the basis of the synchronization signals that are generated by the interface 2 on the transmission line 15, a clock signal is made available in the interface 3 on the line In-CLK (CLK=clock), by which signal the logic circuit 35 is supplied with a clock signal. The control of the interface 2 by the microprocessor 33 is done such that before each high bit or low bit is output, a synchronization signal is output. This synchronization signal represents the synchronization signal for the second interface and the logic unit 33 connected to it, with which synchronization signal the processing of the bit levels in the interface 2 and the logic unit 35 is clocked. Means are also indicated in FIG. 3 that allow data to be transmitted back from the interface 3 to the interface 2. To that end, the interface 3 has the transistor 13, which is connected to the line Out-Data of the logic circuit 35. Via the resistor 12, which together with the resistor 5 of the interface 2 forms a voltage divider, the transmission line 15 can thus be subjected selectively to the potential V2 or V1. The comparator 9 of the interface 2 is connected to a corresponding comparison potential V, which then allows a distinction to be made between the voltage states V2 and V1 on the transmission line 15. However, care must be taken that the interface 3 not have any means which make it possible to realize the third state with the voltage level V0 on the transmission line 15. Only the interface 2 has the means to do that. This if a data transmission from the interface 3 to the interface 2 is planned, then the clock signal continues to be furnished only by the interface 2. To that end, the interface 2 furnishes a synchronization signal on the transmission line 15 by connecting the transmission line to ground via the transistor 8. If the transistor 8 then blocks, then as a function of the switching state of the transistor 13 of the interface 3, a corresponding voltage level, V2 or V1, will be established on the transmission line 15.

The switch 16 can also be utilized to put the data station 32, from a standby state in which it has low current consumption, into an operating state. To do so, the transmission line or data line 15 would then also have to be connected to a component which in the standby state detects the imposition of the voltage level V2 on the data line 15. In the case of a controller for a generator, the switch 16 would be coupled with the ignition key.

If a plurality of interfaces are connected to the transmission line 15, then the entire system is designed such that at any particular time, only a single station can generate a synchronization signal on the transmission line 15. A particular advantage of this system is that only the station that generates the synchronization signal needs to have a certain intelligence and must possess the means for generating a synchronization signal. The other stations can be embodied especially simply; in particular, no oscillating circuits with which a clock signal is generated need be present in these stations. Moreover, these stations may be embodied as a simple logic circuit.

Figure 4:
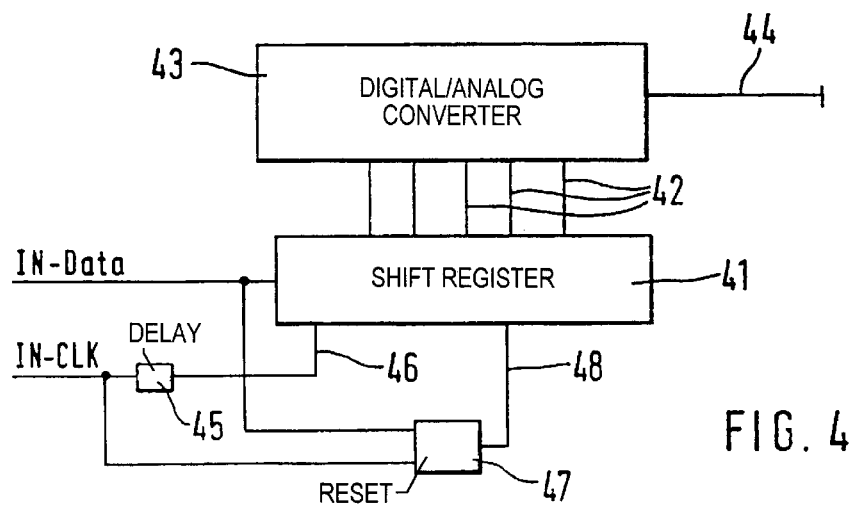
FIG. 4 is a block diagram of one example of a logic circuit present in at least one of the data stations.

In FIG. 4, a simple example for a logic circuit 35 is shown. This example relates to a controller for a generator of the kind used in a motor vehicle. In such a generator, it is desirable for an engine control unit to be capable of transmitting a signal to a generator controller, with which signal the closed-loop control voltage of the generator controller is established. The object is thus by means of a transmission line to transmit an analog signal, which corresponds to a voltage, to the controller. Since numerous stray voltages occur in a motor vehicle, it is not possible to transmit such an analog signal directly, since the voltage levels on the line can vary as a consequence of interference. However, the controller need merely understand the voltage signal, transmitted in the form of bits, and otherwise can be designed comparatively simply. A controller of this kind, which is located downstream of an interface 3, is shown in FIG. 4. The controller has a shift register 41, whose data input is connected to the line In-Data of the interface 3. The shift register 41 also has a clock input 46, which is connected to a delay element 45. A delay elements of this kind can be any arbitrary component with which a brief delay in the signal is associated. This is necessary, since after the transition from V0 to one of the bit levels V1 or V2, a defined signal level must first be established at the data input of the shift register 41. If the sequence of voltage levels as shown in FIG. 2 has been sent over the transmission line 15, then the value 11000 is written into the shift register 41. This value is then present at the parallel output lines 42 of the shift register 41 and serves as an input value for a digital/analog converter 43. Depending on the bits present on the parallel lines 42, an output value, for instance an analog output voltage, is then output over the output line 44 of the digital/analog converter. Such a voltage value then represents the switching level of the generator controller.

The shift register 41 also has a reset input 48, with which the contents of the shift register 41 can be set to a predetermined starting value. The reset input 48 is connected to a reset component 47, which is connected to the In-Data line and the In-CLK line. The reset component 47 detects whether a voltage change has occurred on the line In-Data without a signal having previously been applied to the In-CLK line. If so, then a reset signal is generated, with which the shift register 41 is set to the starting value. Such a signal is used in FIG. 2, in the period t2, to signal the beginning of a data transmission. Thus the shift register 41 can always be reloaded on the basis of a predetermined starting value.

As can be seen in FIG. 4, on the reception side simple logical circuits can be utilized for evaluating the data words that are transmitted digitally over the transmission line 15. A certain intelligence for operating the data transmission need essentially be present only in the station that also makes the synchronization signal available. The system is thus especially highly suitable if a smart main station responds to one or more comparatively simply designed stations.

Further features of the invention are shown in FIGS. 5–9. With a bit-synchronized interface, a method for data transmission can be realized in which the information to be transmitted can be represented by two different voltage levels.

A bit-synchronized interface can for instance be used in a motor vehicle, where it is especially suitable for the connection between the voltage controller and the on-board electrical system, or between the voltage controller and the engine control unit having the digital engine electronics.

Figure 5:
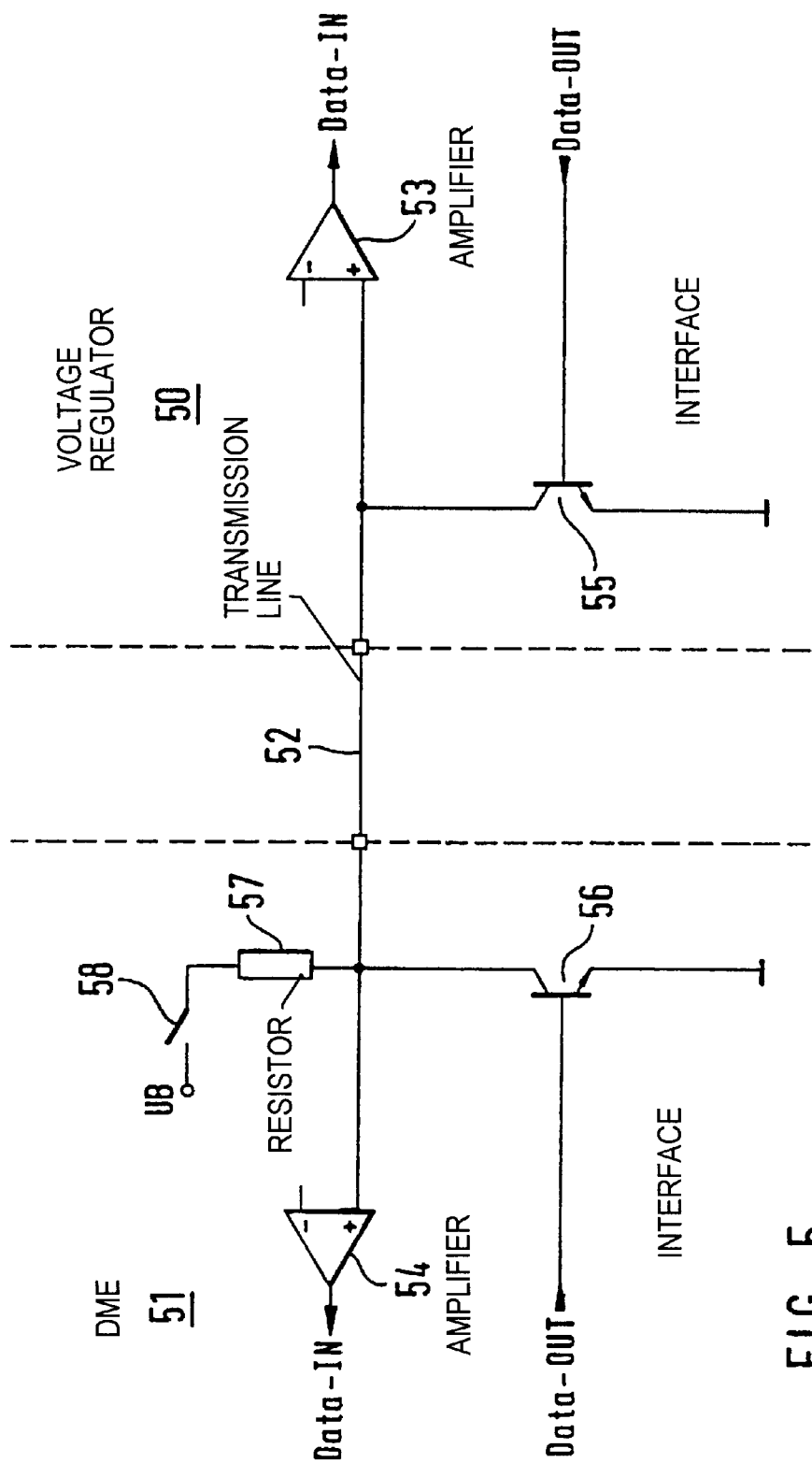
FIG. 5 is a schematic circuit diagram showing exemplary interface structure between a voltage controller and the on-board electrical system of a motor vehicle, or between the digital engine electronics (DME) and the voltage controller.
Figure 9:
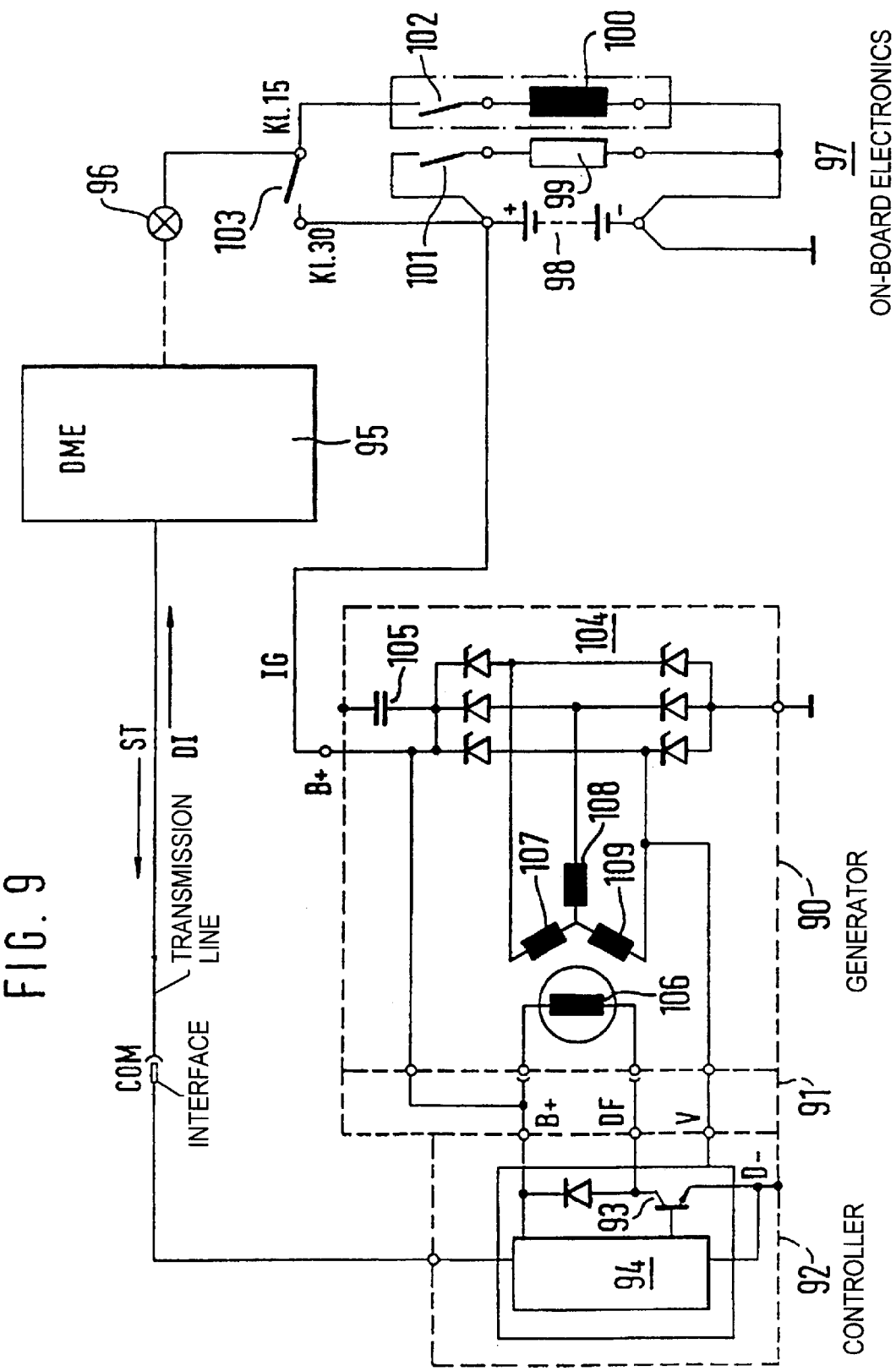
FIG. 9 is a circuit diagram of an exemplary embodiment of a voltage controller with an interface.

FIG. 5 shows the layout of the interface. If this interface is used with an on-board vehicle electrical system, already known in principle, that has a voltage controller as shown in FIG. 9, then a voltage control system can be put together that assures an optimal battery charging state and that improves the charge balance over conventional systems. In the case of a multifunction controller, optimal connections with the engine control unit of the engine electronics are possible without involving additional costs. Fast and reliable control can be accomplished on site with central generation of controlling variables.

The individual possibilities are attained by the characteristics shown in Tables 1–5. They will be understood in conjunction with the drawing figures and the details described hereinafter.

TABLE 1

Interface Between Controller and On-Board Electrical System

Transmission rate of the interface?
Precise command definition for the controller?
Address allocation and hence prioritization of the controller?
Maximum number of receivers for this interface?
-- > Number of bits necessary for addressing

TABLE 2

Interface Between Controller and On-Board Electrical System

Possible Commands
Write:
    Control voltage offset 6 bits (increments of approximately 100 mV)
    Control: ON/OFF control
    LRD 3 bits: 0, 2, 4, . . . , 14 s
    Measurement mode

TABLE 3

Interface Between Controller and On-Board Electrical System

Possible information
Read:
    DFM value 5 bits (resolution approximately 3%)
    Error/status flag 6 bits:
        Overvoltage
        Undervoltage
        Field end stage short circuit toward plus
        Field interruption/short circuit to ground
        Belt breakage
        Full-load monitor

TABLE 4

Interface Between Controller and On-Board Electrical System

Start/stop sequence

1. Detect IGNITION SWITCH ON via HIGH level at interface; controller is activated, but no excitation
    2. Cyclical deactivation (maximum 2-second intervals) of control by transmitting the control-OFF command
    3. If control-OFF is not set within 2 s, the controller enters the normal control mode --> emergency startup via terminal V
    4. If detection of generator turning without IGNITION SWITCH ON, the controller enters the normal control mode --> emergency startup via terminal V
    5. If IGNITION SWITCH OFF and generator is stopped, the controller is turned off

TABLE 5

Interface Between Controller and On-Board Electrical System

Error evaluation

1. If no valid message is transmitted within 2 s, then the controller with all its parameters enters the default state
    2. Errors are transmitted to the engine control unit and processed and optionally indicated by it
    3. An unsuccessful connection to the controller evaluates the engine control unit In FIG. 5, the interface between a voltage controller 50 and the digital engine electronics 51, for instance the control unit of an internal combustion engine or a so-called on-board electrical system control unit or other electronics, is described. The connection is made solely via a line 52, which is located between the amplifier 53 of the controller and the amplifier 54 of the digital engine electronics. The signal DataIN occurs at the output of the two amplifiers 53, 54. The base of a transistor 55 of the controller 50, whose collector is connected to the line 52 and whose emitter is connected to ground, is supplied with the signal DataOUT. In the digital engine electronics DME 51, there is a transistor 56, whose emitter is connected to ground and whose collector is connected to the line 52. Via a resistor 57 and a switching means 58, the collector of the transistor 56 can be applied to battery voltage UB. The base of the transistor 56 is supplied with the signal DataOUT.

Figure 6:
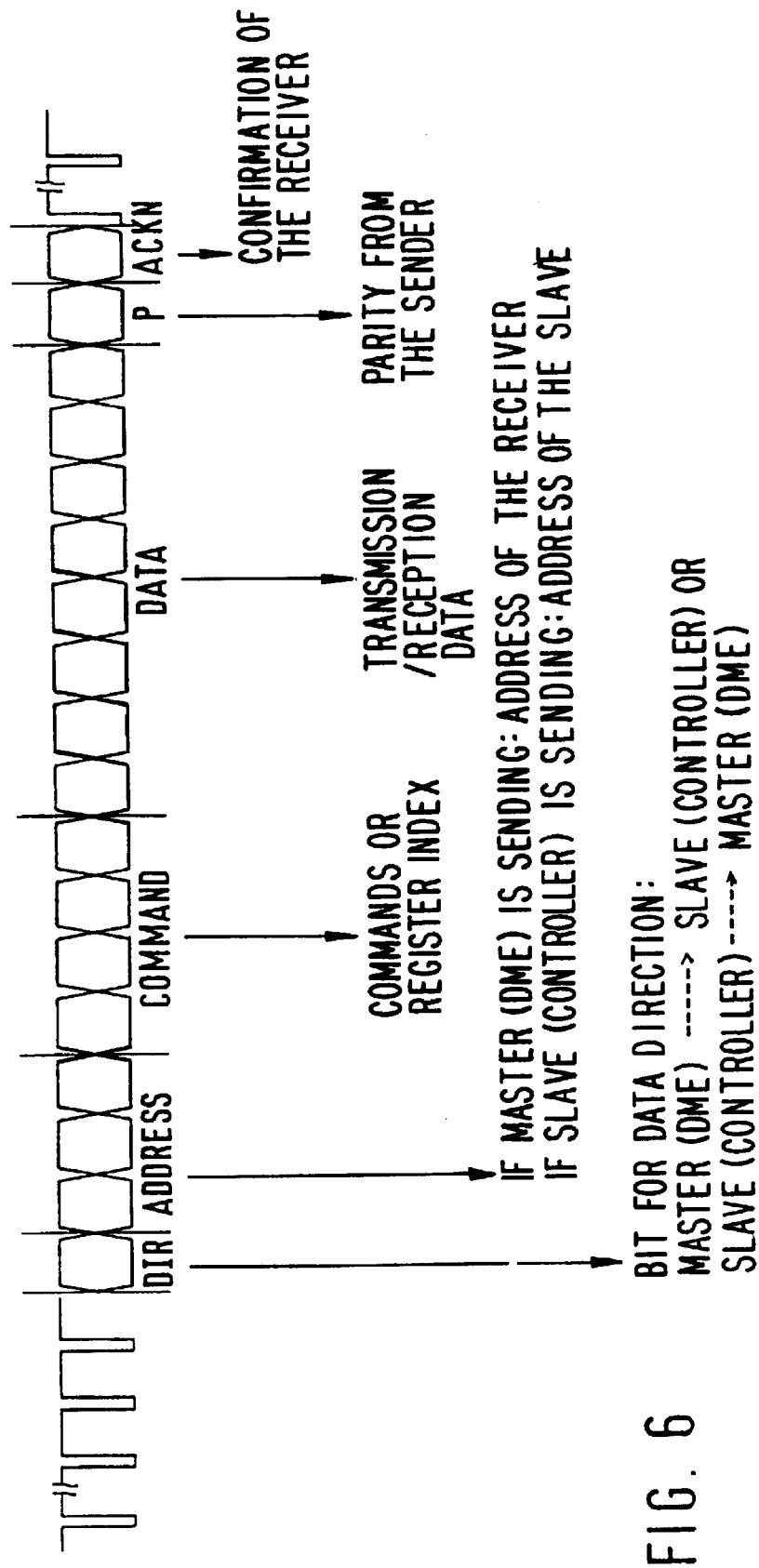
FIG. 6 is a diagram of a transmission protocol.
Figure 7:
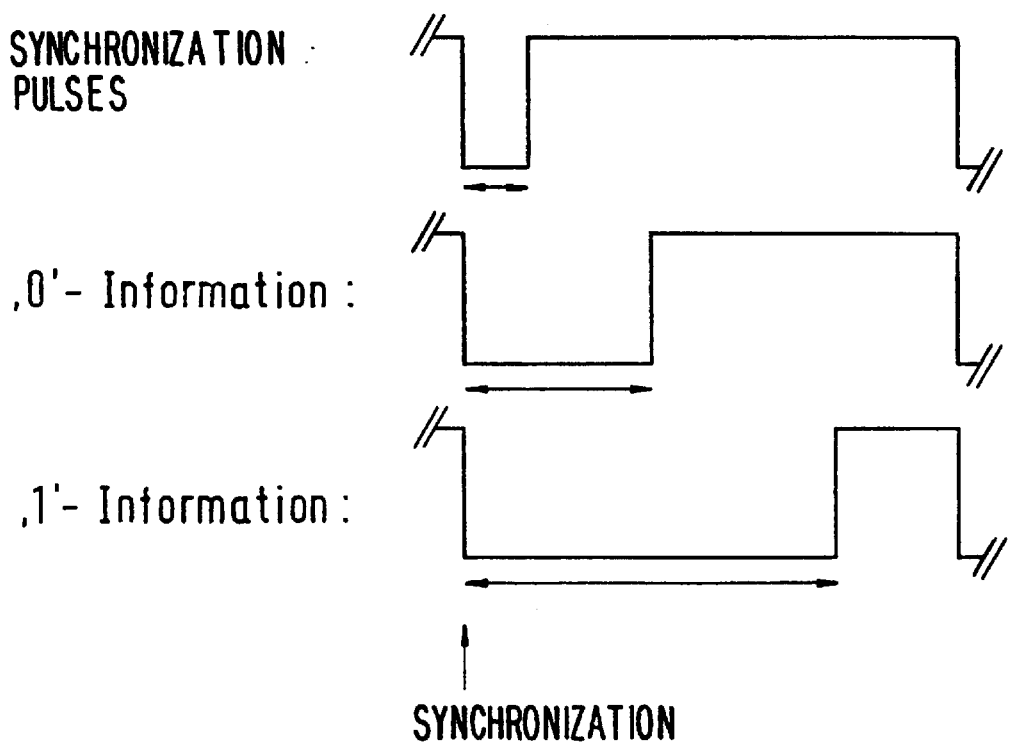
FIG. 7 is a diagrammatic illustration of a bit decoding process.

With the interface shown in FIG. 5 between the controller 50 and the DME 51, a method according to the invention for transmitting data and for receiving data can be realized. A bidirectional, bit-synchronized transmission of items of bit information can be carried out with the information bits SYNC, 0 and 1. The three items of information are distinguished from one another by a pulse-interval-encoded single period. The signal course is shown in FIG. 7. If such an item of information is sent over the line 52, then the desired data can be transmitted. For synchronization, continuous items of SYNC information are sent by the master, and only during a transmission message of n bits are either 0 or 1 items of information transmitted from or to the master. That is, a sequence of Sync-pulses-transmission message-Sync-pulses is transmitted. FIG. 6 shows a transmission protocol that indicates the course over time of the signal transmitted. DIR indicates the bit for the data direction; transmission is either from the master (DME) 51 to the slave (controller) 50, or from the slave (controller) to the master (DME). ADDRESS indicates bits for which the following applied: if transmission is from the master (DME), this indicates the address of the receiver; if transmission is from the slave (controller), this signal portion indicates the address of the slave.

COMMAND indicates commands or a register index. DATA indicates the transmission or reception data. P stands for parity of the sender and ACKN indicates the acknowledgement by the receiver.

Since in the bidirectional bit-synchronized transmissions of items of bit information, shown in FIGS. 6 and 7, work is done with only two voltage levels, and the various items of information are bound into different pulse-interval ratios, the full voltage rise can be utilized and thus a maximum signal to noise ratio can be achieved. The signal SYNC always comes from the master; it is therefore possible to use one-chip oscillators without quartz, since the possibility of synchronization exists. The synchronization can be done to the bit information; that is, errors and tolerances apply only to individual bits and are not added together in the transmitted word. The bidirectional transmission is done, as already noted, simply by lengthening the SYNC signal a single time to yield a 0 datum or a 1 datum. Prioritizing is possible, for instance because the 1 datum is longer than the 0 datum.

Figure 8:
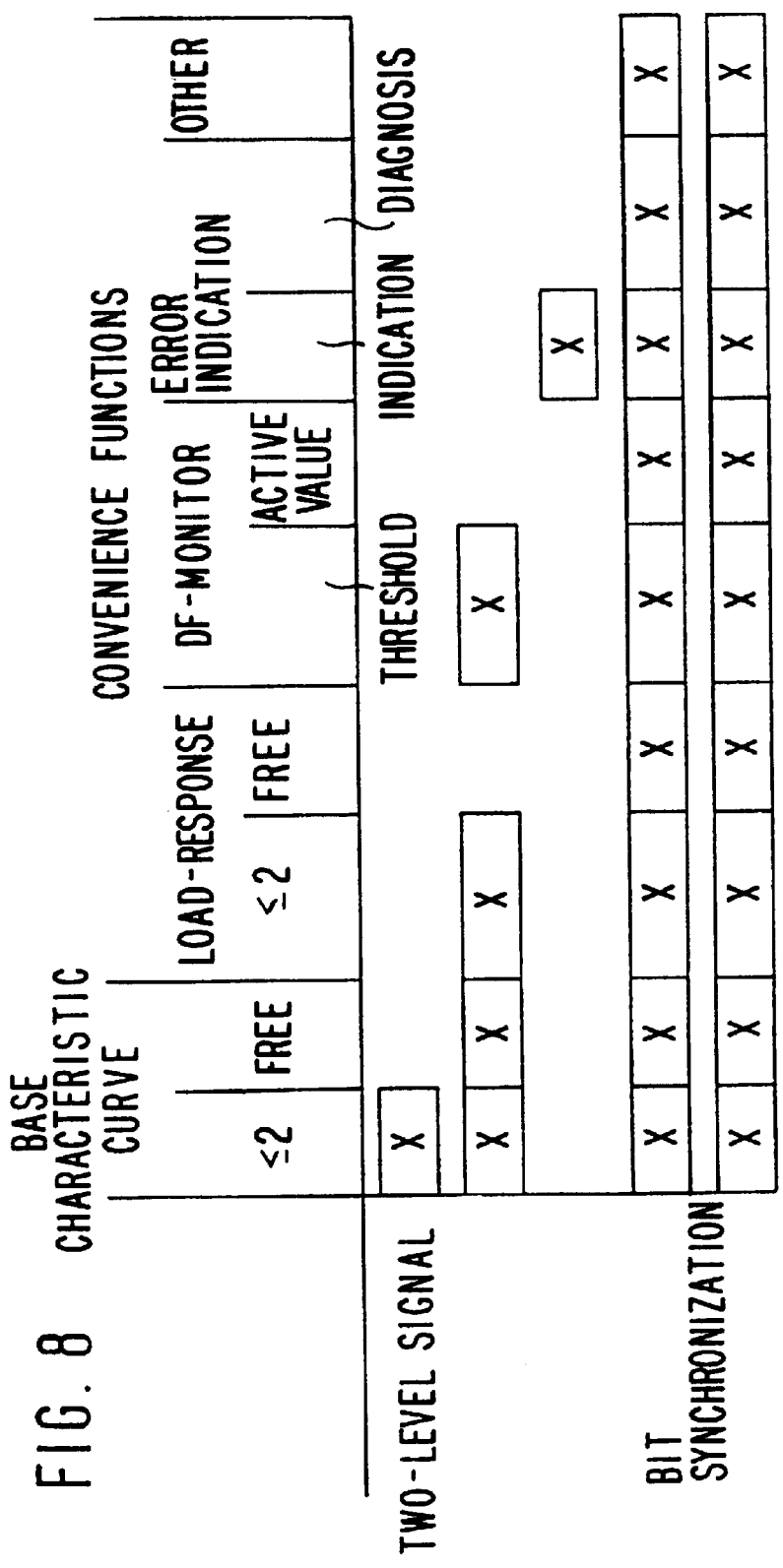
FIG. 8 is a tabulation of basic and convenience functions of the method according to the invention.

FIG. 8 provides a summary of the basic functions as well as possible convenience functions, listing first a two-level signal. Also listed are a pulse width modulated signal, a bit-synchronized interface, and a CAN bus. The bit-synchronized interface and the CAN bus can be expanded for the basic functions and the convenience functions. As the basic function, a characteristic curve for the control function is shown. Convenience functions are a load-response function, a DF monitor, with which the signal applied to the terminal DF is processed. Another convenience function is an error indication, with which the actual indication as well as diagnosis can be accomplished. Other functions are possible.

FIG. 9 shows one possible use of the interface of the invention or the method of the invention for an on-board vehicle electrical system. This on-board vehicle electrical system in a known manner includes a rotary current generator 90, the brush holder 91 with the terminals B+, DF and V. The controller 92, which is equivalent to the controller 50 in FIG. 5, has the D-terminal and in a known manner includes a power portion 93 and a control portion 94. The control portion 94 of the controller 92 is connected to the DME 95, which by way of example is equivalent to the digital engine electronics 51 of FIG. 1, via the interface COM. Between the DME 95 and the controller 92, control signals ST and diagnosis signals DI are exchanged. A connection, not shown in further detail, of the charge indicator light 96 makes an error indication possible. Of the on-board electrical system 97, only the battery 98, a consumer 99, and the starter 100 are shown. The consumer 99 can be connected to the positive pole of the battery 98 via switching means 100, and the starter 100 can be connected to the terminal Kl.15 via the switch 102 (ignition switch ZS), which in turn leads via the starter to terminal Kl.30 and thus to the battery 98.

The generator current IG is tapped via the terminal B+ and leads to the positive terminal of the battery 98. Also connected to the output of the rectifier bridge 104, which is formed for instance by six Zener diodes, is a capacitor 105. Otherwise, of the rotary current generator 90, only the field winding 106 and the stator windings 107, 108 and 109 are shown.

The data transmission can proceed between the control unit DME 95 and the voltage controller 92, or its control portion 94; a data transfer in both directions is possible. Items of information can thus be delivered by the voltage controller to the control unit 95; the control unit 95 can in turn perform the desired control functions, such as the basic and convenience functions listed in FIG. 8.

What is claimed is:

1. A method of transmitting data comprising a sequence of high bits of information and low bits of information over a transmission line from a transmitting device to a receiving device, said method comprising the steps of:

a) transmitting a plurality of synchronization signals over the transmission line from the transmitting device to the receiving device, each of said synchronization signals having a synchronization signal duration; and b) transmitting one and only one of said high bits or one and only one of said low bits from the transmitting device to the receiving device at an end of each of said synchronization signals;

wherein said high bit or said low bit transmitted after each of said synchronization signals has a high bit or low bit duration that is different from said synchronization signal duration.

2. The method as defined in claim 1 wherein each of said high bits has a predetermined fixed high bit voltage level, each of said low bits has a predetermined fixed low bit voltage level and each of said synchronization signals has a predetermined fixed synchronization signal voltage level and said high bit voltage level, said low bit voltage level and said synchronization voltage level are different from each other.

3. The method as defined in claim 1, wherein said transmission line is in a resting state during transmission of either said high bits, said low bits or said synchronization signals over said transmission line, and further comprising putting said transmission line in another state besides said resting state to signal a start of a data transmission.

4. A method of transmitting data in a motor vehicle over a transmission line from a transmitting device in the motor vehicle to a receiving device in the motor vehicle, said data comprising a sequence of high bits of information and low bits of information, said method comprising the steps of:

a) transmitting a plurality of synchronization signals over the transmission line from the transmitting device to the receiving device, each of said synchronization signals having a synchronization signal duration; and b) transmitting one and only one of said high bits or one and only one of said low bits over the transmission line from the transmitting device to the receiving device at an end of each of said synchronization signals;

wherein said high bit or said low bit transmitted after each of said synchronization signals has a high bit or low bit duration that is different from said synchronization signal duration;

wherein said transmitting device is a microprocessor and said receiving device is a voltage controller of said motor vehicle.

5. A method of transmitting data in a motor vehicle over a transmission line from a transmitting device in the motor vehicle to a receiving device in the motor vehicle, said data comprising a sequence of high bits of information and low bits of information, said method comprising the steps of:

a) transmitting a plurality of synchronization signals over the transmission line from the transmitting device to the receiving device, each of said synchronization signals having a synchronization signal duration; and b) transmitting one and only one of said high bits or one and only one of said low bits over the transmission line from the transmitting device to the receiving device at an end of each of said synchronization signals;

wherein said high bit or said low bit transmitted after each of said synchronization signals has a high bit or low bit duration that is different from said synchronization signal duration;

wherein said transmitting device is a microprocessor and said receiving device comprises a plurality of receiving units, and further comprising establishing a transmission protocol for transmissions from said microprocessor to the receiving units.

6. An interface for output of data comprising a sequence of high bits of information and low bits of information on a transmission line, said interface comprising means for transmitting a plurality of synchronization signals over the transmission line from a transmitting device, each of said synchronization signals having a synchronization signal duration; and means for transmitting one and only one of said high bits or one and only one of said low bits from the transmitting device at an end of each of said synchronization signals;

wherein said high bit or said low bit transmitted after each of said synchronization signals has a high bit or low bit duration that is different from said synchronization signal duration.

7. The interface for output of data as defined in claim 6, wherein said means for transmitting said one and only one of said high bits or said low bits includes a voltage divider (5,6) and a first switch (7), said voltage divider comprising a first resistor (5) and a second resistor (6); and said first resistor (5) is arranged between a first voltage (VCC) and a node (4) connected to the transmission line; the second resistor (6) is arranged between the node (4) and said first switch (7); said first switch (7) is connected between the second resistor (6) and a second voltage and said first switch (7) comprises means for selectively switching to output either one of said high bits or one of said low bits.

8. The interface for output of data as defined in claim 7, wherein said means for transmitting said synchronization signals comprises a second switch (8) for connecting the transmission line with the first voltage or the second voltage selectively and said second switch (8) is switched according to the synchronization signal.

9. The interface for output of data as defined in claim 8, further comprising a data line (out-data) and a synchronization line (out-clk) connected with said first switch (7) and said second switch (8) respectively for supplying corresponding trigger signals to said first switch (7) and said second switch (8) from a microprocessor, said microprocessor comprising means for generating said trigger signals.

10. The interface for output of data as defined in claim 6, wherein each of said high bits has a predetermined fixed high bit voltage level, each of said low bits has a predetermined fixed low bit voltage level and each of said synchronization signals has a predetermined fixed synchronization signal voltage level and said high bit voltage level, said low bit voltage level and said synchronization voltage level are different from each other.

11. An interface for receiving data comprising a sequence of high bits of information and low bits of information on a transmission line, said interface comprising means for detecting a plurality of synchronization signals transmitted on said transmission line one after the other, each of said synchronization signals having a synchronization signal duration; and means for detecting one and only one high bit or one and only one low bit on the transmission line at an end of each of said synchronization signals, wherein said high bit and said low bit differ from each other so that said high bit and said low bit are distinguishable from each other;

wherein said high bit or said low bit detected after each of said synchronization signals has a high bit or low bit duration that is different from said synchronization signal duration.

12. The interface for receiving data as defined in claim 11, wherein said means for detecting said synchronization bits and said means for detecting said high or low bit comprises respective comparators (10,11); each of said comparators (10,11) have a first input terminal (+), a second input terminal (−) and an output terminal; said first terminal of each of said comparators is connected to said transmission line and said second terminal of each of said comparators is at a respective comparison voltage value.

13. The interface for receiving data as defined in claim 12, further comprising a data line (In-Data) and a synchronization line (In-CLK) connected with said output terminals of said comparators (10,11) respectively and wherein said high bits or said low bits and said synchronization signals are transmitted to a controller for a generator over said data line (In-Data) and said synchronization line (In-CLK) respectively.

14. The interface for receiving data as defined in claim 11, wherein each of said high bits has a predetermined fixed high bit voltage level, each of said low bits has a predetermined fixed low bit voltage level and each of said synchronization signals has a predetermined fixed synchronization signal voltage level and said high bit voltage level, said low bit voltage level and said synchronization voltage level are different from each other.

15. A method of transmitting data comprising a sequence of high bits of information and low bits of information over a transmission line from a transmitting device to a receiving device, said method comprising the steps of:

a) transmitting a plurality of synchronization signals over the transmission line from the transmitting device to the receiving device, each of said synchronization signals having a synchronization signal duration; and b) transmitting one and only one of said high bits or one and only one of said low bits over the transmission line from the transmitting device to the receiving device at an end of each of said synchronization signals;

wherein each of said high bits has a predetermined fixed high bit voltage level, each of said low bits has a predetermined fixed low bit voltage level and each of said synchronization signals has a predetermined fixed synchronization signal voltage level and said high bit voltage level, said low bit voltage level and said synchronization voltage level are different from each other.

16. The method as defined in claim 15, wherein said high bit or said low bit transmitted over the transmission line after each of said synchronization signals has a high bit or low bit duration that is different from said synchronization signal duration.

17. A method of transmitting data in a motor vehicle over a transmission line from a transmitting device in the motor vehicle to a receiving device in the motor vehicle, said data comprising a sequence of high bits of information and low bits of information, said method comprising the steps of:

a) transmitting a plurality of synchronization signals over the transmission line from the transmitting device to the receiving device, each of said synchronization signals having a synchronization signal duration; and b) transmitting one and only one of said high bits or one and only one of said low bits over the transmission line from the transmitting device to the receiving device at an end of each of said synchronization signals;

wherein each of said high bits has a predetermined fixed high bit voltage level, each of said low bits has a predetermined fixed low bit voltage level and each of said synchronization signals has a predetermined fixed synchronization signal voltage level and said high bit voltage level, said low bit voltage level and said synchronization voltage level are different from each other;

wherein said transmitting device is a microprocessor and said receiving device is a voltage controller of said motor vehicle.

18. A method of transmitting data in a motor vehicle over a transmission line from a transmitting device in the motor vehicle to a receiving device in the motor vehicle, said data comprising a sequence of high bits of information and low bits of information, said method comprising the steps of:

a) transmitting a plurality of synchronization signals over the transmission line from the transmitting device to the receiving device, each of said synchronization signals having a synchronization signal duration; and b) transmitting one and only one of said high bits or one and only one of said low bits over the transmission line from the transmitting device to the receiving device at an end of each of said synchronization signals;

wherein each of said high bits has a predetermined fixed high bit voltage level, each of said low bits has a predetermined fixed low bit voltage level and each of said synchronization signals has a predetermined fixed synchronization signal voltage level and said high bit voltage level, said low bit voltage level and said synchronization voltage level are different from each other;

wherein said transmitting device is a microprocessor and said receiving device comprises a plurality of receiving units, and further comprising establishing a transmission protocol for transmissions from said microprocessor to the receiving units.

19. An interface for output of data comprising a sequence of high bits of information and low bits of information on a transmission line, said interface consisting of means for transmitting a plurality of synchronization signals over the transmission line from a transmitting device, each of said synchronization signals having a synchronization signal duration; and means for transmitting one and only one of said high bits or one and only one of said low bits over the transmission line from the transmitting device at an end of each of said synchronization signals;

wherein each of said high bits has a predetermined fixed high bit voltage level, each of said low bits has a predetermined fixed low bit voltage level and each of said synchronization signals has a predetermined fixed synchronization signal voltage level and said high bit voltage level, said low bit voltage level and said synchronization voltage level are different from each other.

20. The interface for output of data as defined in claim 19, wherein said means for transmitting said one and only one of said high bits or said low bits over the transmission line includes a voltage divider (5,6) and a first switch (7), said voltage divider comprising a first resistor (5) and a second resistor (6); and said first resistor (5) is arranged between a first voltage (VCC) and a node (4) connected to the transmission line; the second resistor (6) is arranged between the node (4') and said first switch (7); said first switch (7) is connected between the second resistor (6) and a second voltage and said first switch (7) comprises means for selectively switching to output either one of said high bits or one of said low bits.

21. The interface for output of data as defined in claim 20, wherein said means for transmitting said synchronization signals over the transmission line comprises a second switch (8) for connecting the transmission line with the first voltage or the second voltage selectively and said second switch (8) is switched according to the synchronization signal.

22. The interface for output of data as defined in claim 20, further comprising a data line (out-data) and a synchronization line (out-clk) connected with said first switch (7) and said second switch (8) respectively for supplying corresponding trigger signals to said first switch (7) and said second switch (8) from a microprocessor, said microprocessor comprising means for generating said trigger signals.

23. An interface for receiving data comprising a sequence of high bits of information and low bits of information on a transmission line, said interface consisting of means for detecting a plurality of synchronization signals transmitted on said transmission line one after the other, each of said synchronization signals having a synchronization signal duration; and means for detecting one and only one high bit or one and only one low bit on the transmission line at an end of each of said synchronization signals, wherein said high bit and said low bit differ from each other so that said high bit and said low bit are distinguishable from each other;

wherein each of said high bits has a predetermined fixed high bit voltage level, each of said low bits has a predetermined fixed low bit voltage level and each of said synchronization signals has a predetermined fixed synchronization signal voltage level and said high bit voltage level, said low bit voltage level and said synchronization voltage level are different from each other.

24. The interface for receiving data as defined in claim 23, wherein said means for detecting said synchronization bits and said means for detecting said high or low bit comprises respective comparators (10,11); each of said comparators (10,11) have a first input terminal (+), a second input terminal (−) and an output terminal; said first terminal of each of said comparators is connected to said transmission line and said second terminal of each of said comparators is at a respective comparison voltage value.

25. The interface for receiving data as defined in claim 24, further comprising a data line (In-Data) and a synchronization line (In-CLK) connected with said output terminals of said comparators (10,11) respectively and wherein said high bits or said low bits and said synchronization signals are transmitted to a controller for a generator over said data line (in-Data) and said synchronization line (In-CLK) respectively.

* * * * *